Nov. 2, 1965   F. G. LIPPE ETAL   3,215,559
METHOD OF PRODUCING SUGAR
Filed Nov. 15, 1962
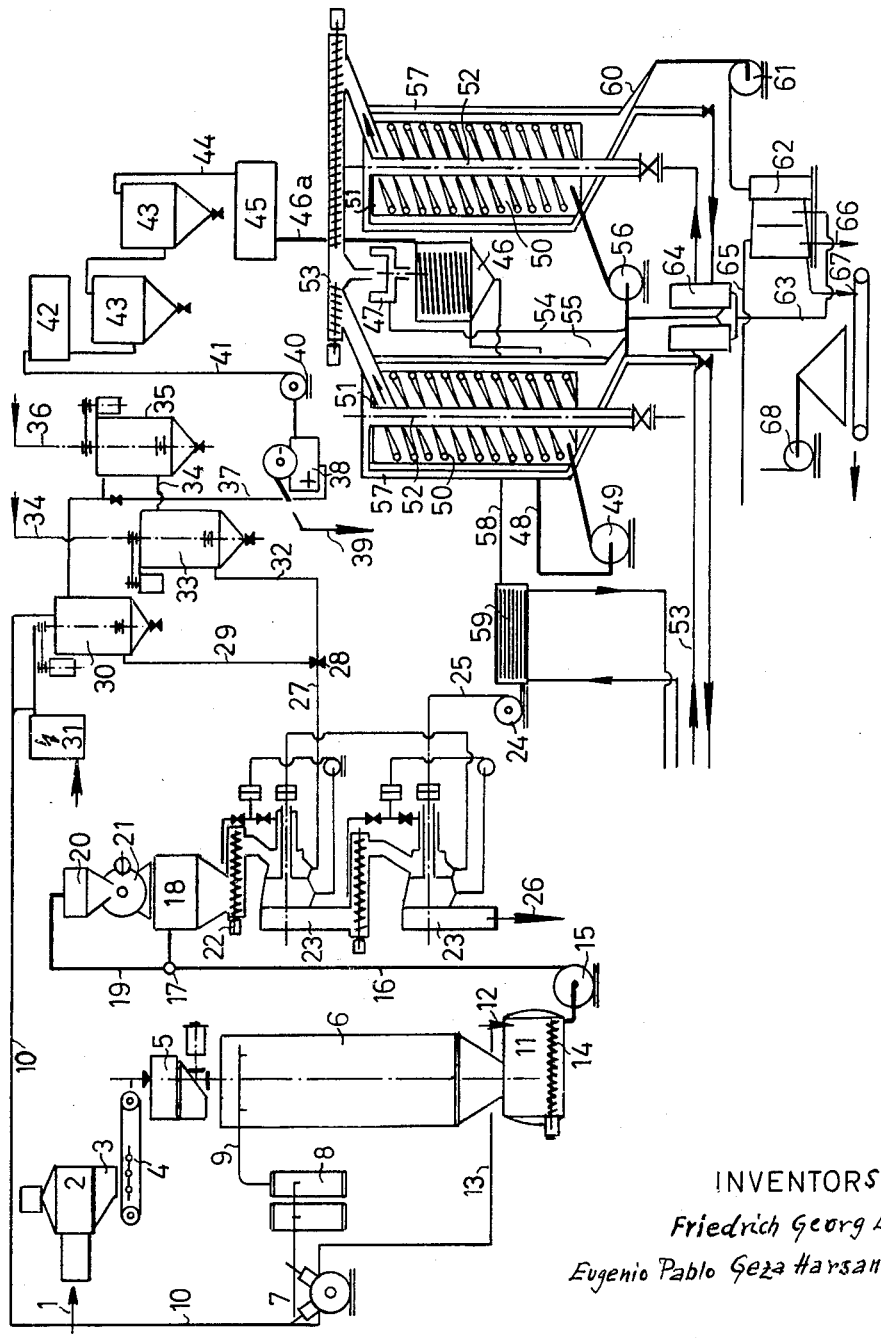
INVENTORS:
Friedrich Georg Lippe
Eugenio Pablo Geza Harsanyi 3,215,559
METHOD OF PRODUCING SUGAR
Friedrich Georg Lippe, Frankfurt am Main, Germany, and Eugenio Pablo Geza Harsanyi, Buenos Aires, Argentina, assignors, by direct and mesne assignments, to Deton Aktiengesellschaft, Vaduz, Liechtenstein, a company of Liechtenstein
Filed Nov. 15, 1962, Ser. No. 237,960
Claims priority, application Germany, May 17, 1962, L 42,012
13 Claims. (Cl. 127—43)

The present invention relates to a method of producing sugar from sugar-bearing plants and fruits which consists in rupturing or exploding the walls of the cells of these plants or fruits containing the sugar-bearing juice without heating the raw material either at the beginning or during the entire processing, applying a pressure medium in the form of compressed air or gas in accordance with the properties of the raw material, maintaining the pressure medium at room temperature prior to the explosion, sterilizing such a medium prior to the explosion by means of ozone, carrying out the entire treatment under the exclusion of any untreated outer air in one continuous process until the pulp is completely disintegrated, and thereafter washing out the sugar content in several stages by means of cold water in a countercurrent and of simultaneously concentrating the solution.

According to the invention, the cold water which is used for washing out the sugar from the completely disintegrated pulp is continuously circulated during the entire operation and continuously regenerated without requiring any substantial addition of fresh water. In some cases, for example, when processing sugar beets or sugar cane, there will even be a continuous surplus of water.

The raw juice attained is preferably purified either by a treatment with aluminum sulphate, the introduction of ozone, or by an electrophoresis or by a combination of several of these treatments. Thereafter the residue is filtered, the clear juice concentrated to oversaturation under the application of the proper temperatures in accordance with the particular degree of saturation and preferably at a temperature below the freezing point, the continuously precipitated sugar crystals are freed of mother syrup by centrifuging and are then washed with alcohol so that a pure white sugar ready for marketing is attained and the clear, colorless residual mother syrup no longer contains any saccharose. The entire process according to the inventive method from the insertion of the raw material to the removal of the final sugar requires a very small amount of energy and may be carried out within a fraction of the time which was previously required for the production of sugar.

According to most of the known methods, the sugar juice or sugar solution is produced from sugar-bearing plants or fruits by pressing out the juice or by diffusion or washing. There are, however, other known methods according to which, for example, sugar beets are comminuted, and then mixed in containers with warm water whereupon the solutions are separated by centrifuging from the pulp. The process of mixing the comminuted material with warm water and then centrifuging the solution from the pulp is repeated as long as any substantial amounts of saccharose particles still remain in the pulp. According to this method, the ruptured cells are washed out, while those which remain whole are macerated as in the diffusion method. Therefore, the length of time which is required for carrying out this method also depends upon the length of time required for the diffusion.

The juices or solutions which are produced according to the mentioned prior methods are freed of contaminants by heating and separation by means of lime and precipitation, and they are concentrated by evaporation in several stages between which the solutions again are treated by separation, precipitation, and filtering until sugar crystals are formed. These prior methods are carried out openly, that is, at a continuous admission of outer air. By the purification and also by heating the raw sugar juice, the component of non-crystallizable sugar in the solution increases by the transformation of the saccharose. The conversion into caramel which is caused by heating gives not only the remaining molasses, but also the raw sugar which has attained a brown color so that the latter cannot be marketed unless it has first been subjected to an additional treatment.

The method according to the invention not only overcomes the above-mentioned disadvantages, but also results in a higher yield in sugar and in a much more economical production than any of the known methods. This is due to the fact that the beets or fruits which are precleaned in the usual manner and are crushed or grated, or the sugar cane, or other sugar-bearing plants which have preferably been cut into cossettes in a slicing machine are inserted into an apparatus in which the grated or cut-up material is subjected to an air or gas pressure of preferably 15 to 20 atm. After a sudden increase in pressure preferably to 45 to 60 atm., a valve is opened whereby the material is suddenly ejected from this apparatus into a receiver and against impact surfaces therein. The pressure-transmitting medium in the form of air or a gas is sterilized by a continuous introduction of ozone which is free of nitric oxide.

The proceedings occurring in the pressure treatment according to the invention are as follows:

The grated material or the cossettes consist of small cells which are filled with cell sap and solid substances which are dissolved therein. Insofar as these cells are not cut open, they are covered by thin membranes. The sap in the cells is normally held therein under a certain pressure in accordance with the outer atmospheric conditions. If the outer pressure upon the cells is increased in a pressure tank, the hydrostatic pressure within the cells will be balanced. If the grated mass is suddenly freed of the external pressure by being ejected from the pressure tank, a sudden rupture or explosion of the cells occurs since the internal pressure cannot become assimulated to the low external pressure within the short period of the ejection. The drop in pressure during the ejection is balanced by a sudden increase in pressure to about 45 to 60 atm. prior to the ejection so that during the ejection all cells of the sugar-bearing material are subjected to a uniform pressure of 15 to 35 atm. During the ejection, the cells are ruptured as the result of the sudden release of the internal pressure of the cell sap and also because of friction and the impact upon solid surfaces.

The disintegrated pulp consisting of fibers, pith, and juice together with dissolved solid substances is washed in a countercurrent in several stages in special washing apparatus by means of cold water which may at least partly consist of ice water which is recovered from the subsequent concentration stage of the process. By this washing treatment, the dissolved substances are extracted and then concentrated.

The following table indicates the values ascertained in a washing test of a beet pulp which was treated according to the invention in comparison to the results attained by the conventional methods.

|  | Diffusing water in percent to beets | Raw juice concentr. in degree Brix | Pulp juice concentration polarization | Pulp dry substance |
|---|---|---|---|---|
| (a) Conventional Methods | 116 | 14 | 0.15 | 14% after screw pressing. |
| (b) Inventive Method, e.g. by means of jet | 55 | 20.8 | 0.30 | 16% after 5 stages. |

The beet pulp contained 5% fibers and pith and 95% juice with dissolved substances.

In evaluating the above statements it is found that the water circulation will produce the following results:

Kg. of solution _____ 95
Kg. of washing water _____ 55
                                                   ———
                                                   150
Minus moisture component of residue at 16% of
  absolutely dry state, kg. _____ 26
                                                   ———
  Kg. of raw juice _____ 124

Kg. of raw juice _____ 124
Minus 20% solid components approx., kg. _____ 25
                                                   ———
  Kg. of water _____ 99
Minus washing water returned to circulation for new
  charge, kg. _____ 55
                                                   ———
  Kg. of surplus of water _____ 44

This shows that a new supply of water is only required at the beginning of an operation, that the solution always contains sufficient water, and in the case as described there is a surplus of water available for other use or for being discarded. The raw juice which according to the new method of production is charged with a higher component in foreign matter, colloids, amides, and the like is preferably treated with milk of lime for separating and flocculating the contaminants, although there is no need for providing the sugar solution with an excess of undissolved lime. The precipitation is also preferably carried out by means of aluminum sulphate which only requires one procedure at a considerably reduced reaction period. The small amounts of Glauber's salt which are produced in this treatment are removed together with the other mineral salts by means of an ion exchanger at the end of the process before the return of the mother syrup into the process. A further purification of the raw juice is carried out by an electrophoresis or by the introduction of ozone into the raw juice in very accurately determined amounts by means of special apparatus. All contaminants, colloids, and albumins are then separated or flocculated, while by the application of ozone also all bacteria are killed. Because of the low temperatures and the extremely short length of the process (approximately one hour from the insertion of the raw product to the final sugar), there is no acidulation of the pulp or the raw juice. The pH value of the raw juice which is produced according to the inventive method as stated in the table under "b" was found to amount to between 6 and 7 after standing for 12 hours. The flocculated or precipitated contaminants are separated in a suitable filter apparatus. The concentration of the clear juice until the solution is oversaturated and sugar crystals are precipitated is carried out within temperature ranges in accordance with the different degrees of saturation, preferably below the freezing point. The precipitated sugar crystals are preferably centrifuged in several stages. In the first of these stages, they are freed of the mother syrup, while in the subsequent stages they are subjected to a washing treatment by means of alcohol which is circulated until it is saturated to such an extent that any further washing would be practically of no value, whereupon the alcohol is drawn off and regenerated and thereafter returned to the apparatus for the further washing process. The remaining mother syrup which is clear and colorless is then freed of the mineral salts in an ion exchanger and thereafter returned to the circulation or employed for fermentation or other industrial purposes.

The method according to the invention for producing sugar from sugar-bearing plants and fruits, especially dates, may be more clearly illustrated by reference to the accompanying drawing which shows diagrammatically a preferred apparatus for carrying out this method as one continuous process.

In the apparatus as illustrated in the drawing, the sugar-bearing plants or fruits which are first cleaned in the usual manner are filled at 1 into a grater or slicer 2. The grated mass or the cossettes then drop through a funnel 3 upon a belt scale 4 which, in cooperation with a charging device 5, supplies an accurately measured amount of the material to the cells of a cell-rupturing or exploding apparatus 6. The output of the grater or slicer 2 is electrically controlled by the belt scale 4 in accordance with the speed of operation of the exploding apparatus 6. The necessary medium for transmitting the pressure to the material in the apparatus 6 is supplied thereto by a compressor 7 through pressure tanks 8 and a pipe line 9. If the pressure medium consists of air, it is first sterilized by means of ozone which is supplied through a pipe line 10. The exploding apparatus 6 expels the disintegrated material in the form of pulp into a receiver 11. The superatmospheric pressure is discharged through a valve 12 and is returned through a pipe line 13 to the compressor 7. From the receiver 11 the disintegrated pulp is passed by a conveyor screw 14 to a pump 15 which, if the pulp is attained from sugar beets or fruits, passes the same through a pipe line 16 and a three-way valve 17 directly to a container 18. If the pulp is attained from sugar cane, it is, however, necessary first to eliminate the residual joints from the pulp. For this purpose, the pulp is passed through a pipe line 19 to an intermediate container 20 from which it is passed to a disintegrator 21 which then ejects the pulp into the container 18. A conveyor screw 22 then passes the pulp through a group of washing apparatus 23 into which the water is introduced in a countercurrent by a pump 24 through a pipe line 25, and in which the pulp is washed in several stages to remove its sugar content and the resultant solution is concentrated.

The washed pulp is removed from the washing apparatus at 26. The concentrated sugary solution is then passed through a pipe line 27 and a three-way valve 28 either through a pipe line 29 to a container 30 in which ozone from an ozone generator 31 is thoroughly intermixed with the solution by a special stirring mechanism, or through a pipe line 32 to a container 33 in which, likewise by means of a special stirring mechanism, an accurately measured amount of milk of lime supplied through a pipe line 34 is stirred into the solution. This mixed solution is then passed from the container 33 through a line 34 to a container 35 to which a certain amount of an aluminum sulphate solution is added through line 36 and by means of a stirring mechanism the added lime together with all contaminants is separated by precipitation and flocculation.

In the event the purification is carried out by means of ozone, the turbid solution is passed through a pipe line 37 to an electrophoresis cell 38 and from the latter through the same line through which the solution is withdrawn from the container 35 if it has been treated with lime and precipitated by aluminum sulphate. In the electrophoresis cell the coarse contaminants are separated and discharged at 39. The pre-cleaned solution is then conveyed by a pump 40 through a pipe line 41 into a container 42 and from the latter for the final purification into and through the filtering apparatus 43 and then through a pipe line 44 into a container 45. The clear solution then flows from this container through a pipe line 45a into a heat exchanger 46 in which, by means of ice coming from a centrifuge 47, the solution is cooled to a temperature of +1° C.

By means of a pump 49 the cooled solution is then pumped through a pipe line 48 tangentially upwardly into a strainer 50 in a container 51 into which through a central vertical pipe 52 and through the hollow spirals of the strainer 50 a coolant is passed from a refrigerator 53. The ice which is then formed is driven upwardly and out of the solution by the tangentially increasing acceleration and introduced into the centrifuge 47 by means of a conveyor screw 53. The centrifuged mother syrup is added through a pipe line 54 at 55 to the concentrated solution which emerges from the container 51. Another pump 56 then pumps the solution into a second strainer stage which functions similarly to the first stage and is therefore identified by the same numerals. The coolant flows between outer double jacket 57 of the second container 51 back to the refrigerator 53, while the water which is melted from the ice flows through a pipe line 58 and a heat exchanger 59 back to the washing apparatus.

The sludge consisting of sugar crystals and mother syrup which flows from the second stage at 60 is passed by a pump 61 to a centrifuge 62, and the mother syrup which is centrifuged in the first stage passes through a pipe line 63 to an ion exchanger 64 and thereafter to the pump 56. In the second stage of the centrifuge 62, the sugar crystals are washed with alcohol which is supplied through a line 65 and leaves the centrifuge at 66 in order to be subsequently regenerated.

The sugar crystals fall from the centrifuge upon a conveyor belt 67 from which the alcoholic vapor is withdrawn by a suction fan 68 thereby recovering the alcohol. The crystalline sugar is then ready for being packed in the usual manner.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. A method of continuously producing crystalline sugar from sugar-bearing plants and fruits comprising the steps of subjecting sap-bearing raw materials without prior heating to a high pressure of a gaseous pressure medium substantially at room temperature, then suddenly releasing said pressure at least to an atmospheric pressure thereby exploding and completely disintegrating the cellular system of said materials to a pulp, continuously washing out the sugar content of said pulp in several successive stages by means of cold water in countercurrent, and simultaneously concentrating the solution to produce a raw sugar syrup, then purifying said syrup and concentrating the same at temperatures below freezing until a continuous precipitation of sugar crystals occurs and freeing the crystals from the mother syrup by centrifuging.

2. A method as defined in claim 1, in which said syrup is purified by aluminum sulphate.

3. A method as defined in claim 1, in which said syrup is purified by an electrophoresis.

4. A method as defined in claim 1, in which said syrup is purified by aluminum sulphate and an electrophoresis.

5. A method as defined in claim 1, in which said syrup is purified by ozone free of nitric oxide.

6. A method as defined in claim 1, in which said gaseous pressure medium consists of air, and further comprising the step of sterilizing said air prior to the release of its pressure with ozone free of nitric oxide.

7. A method as defined in claim 1, in which said gaseous pressure medium consists of air, and further comprising the steps of sterilizing said air prior to the release of its pressure with ozone free of nitric oxide and thereafter continuously regenerating said ozone and returning it for sterilizing the air required for further explosions.

8. A method as defined in claim 1, in which said gaseous pressure medium consists of air, and further comprising the step of sterilizing said air prior to the release of its pressure with ozone free of nitric oxide.

9. A method as defined in claim 1, in which after the first charge of disintegrated pulp has been treated, the water required for washing out further charges of disintegrated pulp is taken from the melted ice which is returned after the step of concentrating the syrup.

10. A method as defined in claim 1, further comprising the step of washing the sugar crystals by means of alcohol until sufficiently pure for marketing.

11. A method as defined in claim 1, further comprising the step of washing the sugar crystals by means of alcohol and continuously circulating the alcohol until it is so saturated as not to produce any further substantial purification of the sugar crystals.

12. A method as defined in claim 11, further comprising the step of regenerating the saturated alcohol and then returning it for the further washing process.

13. A method as defined in claim 1, further comprising the step of subjecting the mother syrup remaining after the separation of the sugar crystals to a treatment in an ion exchanger for freeing it of mineral salts.

References Cited by the Examiner

UNITED STATES PATENTS

| 573,290 | 12/96 | Pridham | 127—52 |
| 940,644 | 11/09 | Monti | 62—124 |
| 2,807,560 | 9/57 | Brownell et al. | 127—43 |

OTHER REFERENCES

Int. Sugar Jour., Manufacture of White Sugar, Using Ozonized Air, vol. 24, 1922, pp. 28–30.

Lock: Sugar Growing and Refining, 1882, E. & F. N. Spon, London, pp. 496–505, 509 and 510 relied on.

McGinnis: Beet-Sugar Technology, 1951, Reinhold Pub. Corp., New York, pp. 133–137, 139, 160–161, 289, 303, 304 and 359–361 relied on.

MORRIS O. WOLK, *Primary Examiner.*